US010171710B2

(12) United States Patent
Matsuo

(10) Patent No.: US 10,171,710 B2
(45) Date of Patent: Jan. 1, 2019

(54) DEVICE AND METHOD FOR DIGITAL DATA DISTRIBUTION, DEVICE AND METHOD FOR DIGITAL DATA REPRODUCTION, SYNCHRONIZED REPRODUCTION SYSTEM, PROGRAM, AND RECORDING MEDIUM

(71) Applicant: Eiji Matsuo, Tokyo (JP)

(72) Inventor: Eiji Matsuo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 805 days.

(21) Appl. No.: 14/380,016

(22) PCT Filed: Mar. 6, 2013

(86) PCT No.: PCT/JP2013/056090
§ 371 (c)(1),
(2) Date: Aug. 20, 2014

(87) PCT Pub. No.: WO2013/150852
PCT Pub. Date: Oct. 10, 2013

(65) Prior Publication Data
US 2015/0062431 A1 Mar. 5, 2015

(30) Foreign Application Priority Data

Apr. 4, 2012 (JP) ................. 2012-085271

(51) Int. Cl.
G09G 5/00 (2006.01)
G09G 5/12 (2006.01)
(Continued)

(52) U.S. Cl.
CPC .......... H04N 5/0675 (2013.01); G09G 5/008 (2013.01); G11B 27/10 (2013.01); H04N 5/04 (2013.01);
(Continued)

(58) Field of Classification Search
None
See application file for complete search history.

(56) References Cited

U.S. PATENT DOCUMENTS 5,808,722 A * 9/1998 Suzuki ................ G03B 31/04
348/515
6,597,370 B1 7/2003 Lee
(Continued)

FOREIGN PATENT DOCUMENTS

CN 1284672 A 2/2001
CN 1692649 A 11/2005
(Continued)

Primary Examiner — Joseph G Ustaris
Assistant Examiner — William Adrovel
(74) Attorney, Agent, or Firm — Birch, Stewart, Kolasch & Birch, LLP

(57) ABSTRACT

In order to eliminate timing offset between reproduction devices when a content transmitted from a distribution device is received and reproduced by a plurality of reproduction devices, data (SCR) indicating the elapsed time from the start of the content, generated by counting clock pulses, and data (FCR) indicating a frame number generated by counting the number of frames reproduced by a decoder (54) are transmitted by the distribution device, and a clock generation unit (103) in each reproduction device is controlled so that data (STC) indicating the elapsed time and data (FTC) indicating the frame number, which are generated in the same manner by each reproduction device, match the transmitted data (SCR, FCR). Synchronization between reproduction devices can thereby be established even when, in a state in which a content is being reproduced by one reproduction device, another reproduction device subsequently connects to the distribution device.

5 Claims, 12 Drawing Sheets

(51) Int. Cl.

| | |
|---|---|
| *H04J 3/06* | (2006.01) |
| *H04N 5/04* | (2006.01) |
| *H04N 5/12* | (2006.01) |
| *G11B 20/10* | (2006.01) |
| *G11B 27/10* | (2006.01) |
| *H04L 27/00* | (2006.01) |
| *H04N 21/43* | (2011.01) |
| *H04N 5/067* | (2006.01) |
| *H04W 56/00* | (2009.01) |
| *H04N 21/242* | (2011.01) |
| *H04N 21/8547* | (2011.01) |

(52) U.S. Cl.
CPC ....... *H04N 21/242* (2013.01); *H04N 21/4305* (2013.01); *H04N 21/8547* (2013.01); *G09G 5/12* (2013.01); *G09G 2330/12* (2013.01); *G09G 2340/02* (2013.01); *G09G 2370/10* (2013.01); *G11B 20/10* (2013.01); *G11B 2020/10537* (2013.01); *H04J 3/0638* (2013.01); *H04J 3/0667* (2013.01); *H04J 3/0685* (2013.01); *H04L 2027/0065* (2013.01); *H04N 5/126* (2013.01); *H04N 21/4302* (2013.01); *H04N 21/4307* (2013.01); *H04W 56/001* (2013.01); *H04W 56/002* (2013.01); *H04W 56/0015* (2013.01)

(56) References Cited

U.S. PATENT DOCUMENTS

| | | | |
|---|---|---|---|
| 6,754,234 B1 * | 6/2004 | Wiesner | H04N 5/126 348/E5.021 |
| 7,058,729 B1 * | 6/2006 | Le Scolan | H04J 3/0655 370/321 |
| 2002/0095531 A1 | 7/2002 | Mori et al. | |
| 2003/0156342 A1 * | 8/2003 | Yap | G11B 20/10 360/39 |
| 2003/0160897 A1 * | 8/2003 | Park | H04N 9/45 348/498 |
| 2005/0177860 A1 * | 8/2005 | Goyal | H04N 5/44 725/118 |
| 2005/0213759 A1 | 9/2005 | Tsuchida | |
| 2007/0189399 A1 * | 8/2007 | Christison | H04N 21/4305 375/240.28 |
| 2008/0079658 A1 | 4/2008 | Naito et al. | |
| 2008/0211825 A1 | 9/2008 | Sunakawa et al. | |
| 2009/0109988 A1 * | 4/2009 | Musunuri | G06F 3/14 370/412 |
| 2009/0222685 A1 | 9/2009 | Foster et al. | |
| 2010/0235486 A1 * | 9/2010 | White | H04L 43/0858 709/223 |
| 2010/0239051 A1 * | 9/2010 | Kathiresan | H04L 27/1525 375/329 |
| 2011/0038370 A1 | 2/2011 | Tapie et al. | |
| 2011/0196918 A1 * | 8/2011 | Kkunigita | H04N 5/76 709/203 |
| 2012/0050614 A1 * | 3/2012 | Sawada | G09G 5/008 348/521 |
| 2012/0246690 A1 * | 9/2012 | Einarsson | H04N 21/23406 725/109 |

FOREIGN PATENT DOCUMENTS

| | | |
|---|---|---|
| CN | 101721011 A | 6/2010 |
| CN | 101783868 A | 7/2010 |
| CN | 101843065 A | 9/2010 |
| EP | 1223755 A2 | 7/2002 |
| JP | 9-321687 A | 12/1997 |
| JP | 2000-322039 A | 11/2000 |
| JP | 2000-350182 A | 12/2000 |
| JP | 2001-24630 A | 1/2001 |
| JP | 2003-18582 A | 1/2003 |
| JP | 2003-173614 A | 6/2003 |
| JP | 2004-172725 A | 6/2004 |
| JP | 2006-310964 A | 11/2006 |
| JP | 2006-325082 A | 11/2006 |
| JP | 2007-104347 A | 4/2007 |
| JP | 2008-96746 A | 4/2008 |
| JP | 2008-193616 A | 8/2008 |
| JP | 2009-527152 A | 7/2009 |
| JP | 2011-35578 A | 2/2011 |
| JP | 2011-60192 A | 3/2011 |
| JP | 2011-518509 A | 6/2011 |
| WO | WO 2006/025093 A1 | 3/2006 |

* cited by examiner

DEVICE AND METHOD FOR DIGITAL DATA DISTRIBUTION, DEVICE AND METHOD FOR DIGITAL DATA REPRODUCTION, SYNCHRONIZED REPRODUCTION SYSTEM, PROGRAM, AND RECORDING MEDIUM

TECHNICAL FIELD

The present invention relates to a digital data distribution device and method and a digital data reproduction device and method, more particularly to technology for obtaining frame synchronization when an identical content is reproduced on a plurality of display devices. The invention further relates to a synchronized reproduction system equipped with the above digital data distribution device and digital data reproduction device. The invention relates further to a program for causing a computer to execute the digital data distribution method, a program for causing a computer to execute the digital data reproduction method, and a computer-readable recording medium on which either of these programs is recorded.

BACKGROUND ART

Conventional reproduction systems have synchronized the picture reproduction of a selected content by using a frame synchronization signal on a digital bus (for example, patent reference 1).

PRIOR ART REFERENCES

Patent Reference

Patent reference 1: Japanese Patent Application Publication No. 2003-173614

SUMMARY OF THE INVENTION

Problems to be Solved by the Invention

The conventional systems start decoding operations in synchronization with the frame synchronization signal. Consequently, synchronization can be established when distribution from the transmitting-side device starts after all reproduction devices are in the receiving mode. A problem is that when the transmitting-side device is distributing a content continuously, a reproduction device that connects later and then starts to reproduce the content cannot establish frame synchronization. Another problem is the skipping of frames when synchronization is lost and then recovered. Gradually increasing loss of frame synchronization during lengthy reproduction continues is yet another problem.

Means for Solving the Problem

A digital data distribution device according to the invention comprises:

a clock generation unit for generating clock pulses with a given frequency;

a data reading unit for reading a content including audio and video from a storage medium that stores the content;

a decoder for decoding the content read by the data reading unit;

a reference clock counter that is reset when decoding of each content begins and thereafter counts the clock pulses generated by the clock counter to generate data indicating elapsed time from the start of the content for at least some frames constituting the video of the content;

a frame synchronization counter that is reset when decoding of each content begins and thereafter counts the number of frames constituting the video decoded by the decoder to generate data indicating a frame number in the content for at least some of the frames constituting the video of the content; and a communication unit for transmitting data of the content that have been read from the storage medium, transmitting the data indicating the elapsed time generated by the reference clock counter, and transmitting the data indicating the frame number generated by the frame synchronization counter.

A digital data reproduction device according to the invention comprises:

a clock generation unit for generating clock pulses with a given frequency;

a communication unit for receiving data of a content including audio and video and, for at least some frames constituting the video, data indicating elapsed time from the start of the content and data indicating a frame number in the content;

a decoder operating on the clock pulses to decode the audio and the video of the content received by the communication unit;

a separation unit for separating the data indicating the elapsed time and the data indicating the frame number from the data received by the communication unit;

a reference clock counter in which the data indicating the elapsed time received by the communication unit is set as an initial value when, on a basis of the data of the content received by the communication unit, reproduction of the content begins, the reference clock counter counting the clock pulses generated by the clock generation unit to generate internal data indicating elapsed time from the start of the content for at least some of the frames constituting the video of the content;

a frame synchronization counter in which the data indicating the frame number received by the communication unit is set as an initial value, when the reproduction of the content begins, the frame synchronization counter counting the number of frames constituting the video decoded by the decoder to generate internal data indicating a frame number in the content for at least some of the frames constituting the video of the content;

a frame synchronization comparator for comparing the data indicating the frame number received by the communication unit with the internal data generated by the frame synchronization counter, during the reproduction of the content;

a clock comparator for comparing the data indicating the elapsed time received by the communication unit with the internal data generated by the reference counter, during the reproduction of the content; and a frequency control unit for combining a comparison result obtained by the frame synchronization comparator with a comparison result obtained by the clock comparator and controlling the frequency of the clock pulses generated by the clock generation unit on a basis of a result of combination.

A synchronized reproduction system according to the invention comprises the above digital data distribution device and one or more of the above digital data reproduction devices which are connected to the digital data distribution device by a digital bus.

Effect of the Invention

The invention can synchronize reproduction by a plurality of reproduction devices. In addition, if, while one reproduction device is already reproducing a given content, another reproduction device is connected to the distribution device, these reproduction devices can also be synchronized.

MODE FOR CARRYING OUT THE INVENTION

First Embodiment

Figure 1:
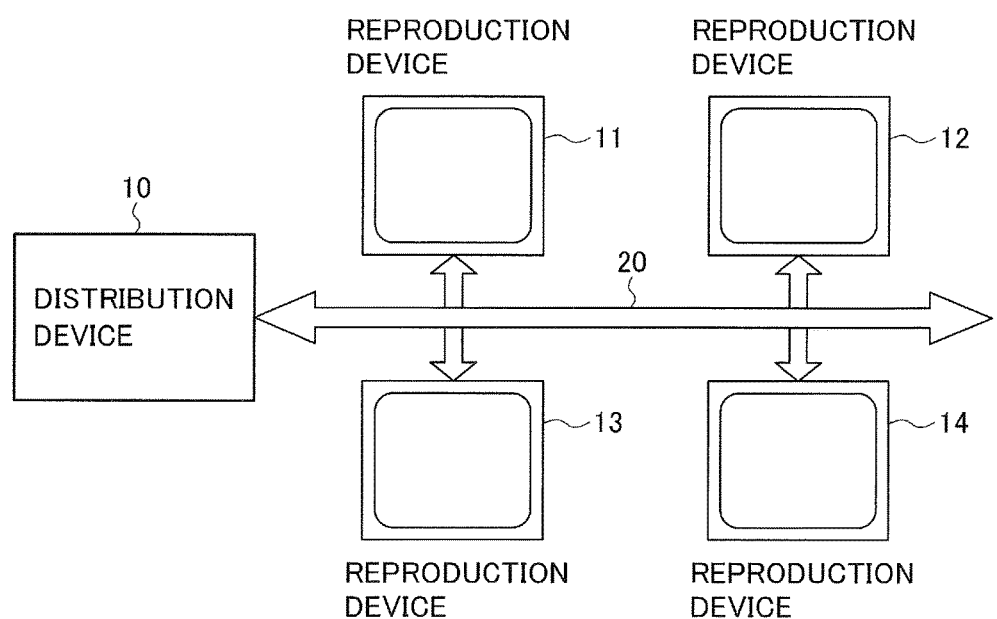
FIG. 1 is a diagram showing a content reproduction system according to a first embodiment of the invention.

FIG. 1 shows a content reproduction system according to the first embodiment of the invention.

The illustrated content reproduction system has a distribution device 10 as a transmitting-side device, and a plurality of reproduction devices 11 to 14 as receiving-side devices. The distribution device 10 and reproduction devices 11 to 14 are interconnected by a digital bus 20. The content reproduction system shown in FIG. 1 is used in, for example, a rear seat entertainment system for listening to audio and viewing video in the cabin of a car.

The digital bus 20 may be in the form of wired connections such as MOST (Media-Oriented System Transport), IEEE 1394, or Ethernet connections. Alternatively, the digital bus 20 may be in the form of wireless connections such as those referred to as WiFi or Bluetooth (registered trademark).

The reproduction system may be used in a mode in which a content distributed from the single distribution device 10 is received by the plurality of reproduction devices 11 to 14, video and audio are reproduced by the plurality of the reproduction devices 11 to 14 for display on respective display units and for audio output by an audio output device in one or more of the reproduction devices. A loudspeaker or headphones, for example, may be used as the audio output device in this case. Audio may be output simultaneously from all the reproduction devices, or may be output from only some one of the reproduction devices.

If there is any timing offset in picture among the plurality of the reproduction devices 11 to 14, synchronization with the sound is imperfect, which is disconcerting. To solve this problem, it would be desirable to achieve reproduction with timing offset of not even one frame.

It would also be desirable for reproduction timing offset not to occur even when, while one reproduction device (for example, reproduction device 11) is already reproducing a given content, other reproduction devices (reproduction devices 12 to 14) are connected to the distribution device 10 at different timings and start to reproduce the same content.

It would also be desirable for timing offset of picture of even one frame not to occur among the reproduction devices 11 to 14 even during lengthy reproduction.

In addition, when synchronization is lost, it would be desirable to recover synchronization without skipping frames.

The reproduction system of the present invention meets these requirements.

Figure 2:
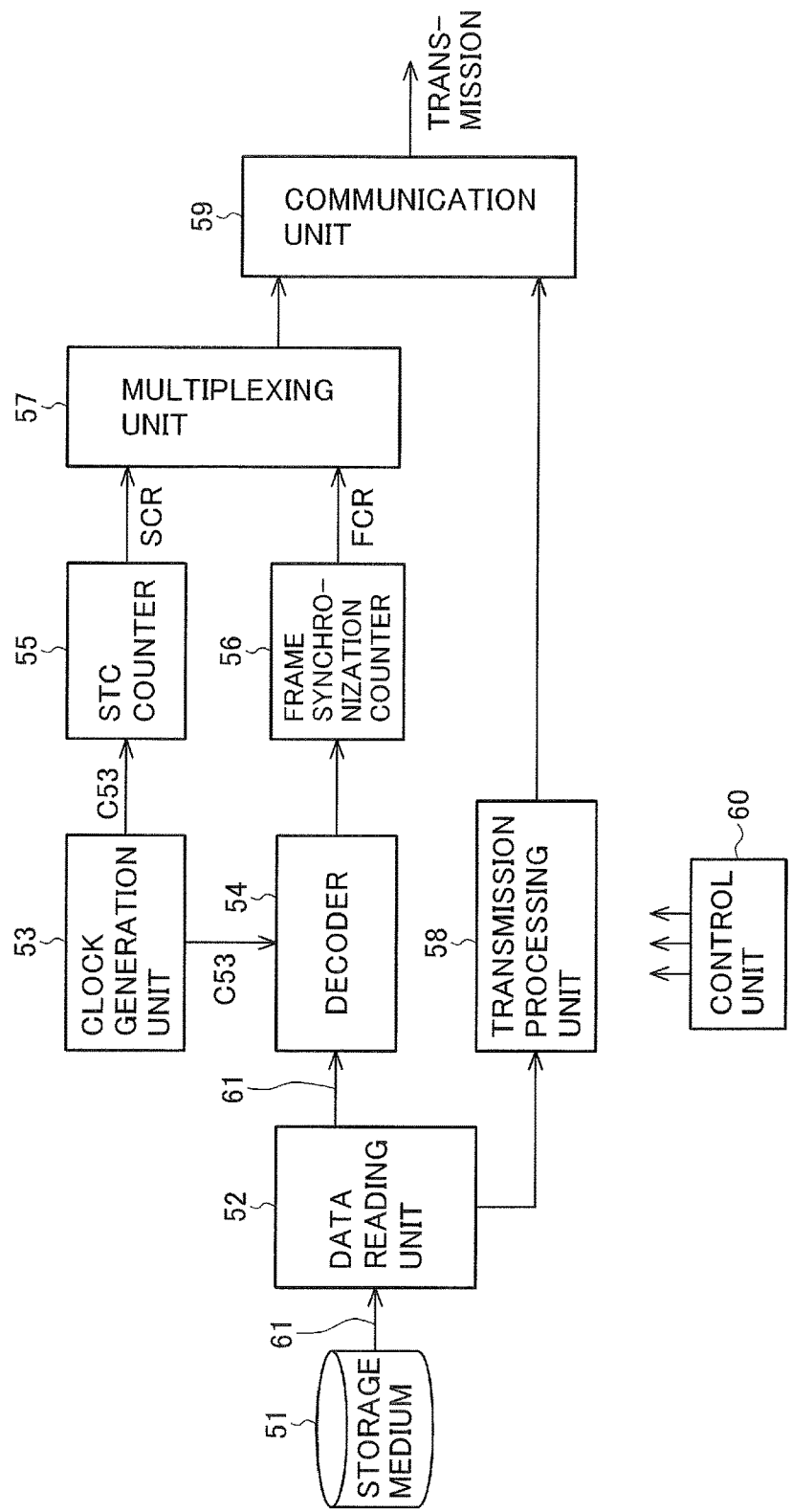
FIG. 2 is a block diagram showing an example of the configuration of the digital data distribution device in the content reproduction system in FIG. 1.

FIG. 2 shows an example of the configuration of the distribution device 10 in FIG. 1. The illustrated transmitting device reads a content from a storage medium 51 such as an HDD, a DVD, a USB memory, an SD memory card, a CD-ROM, or a Blu-ray disc in which the content is stored, and transmits the content toward the reproduction devices 11 to 14 shown in FIG. 1 via the digital bus 20, and has a data reading unit 52, a clock generation unit 53, a decoder 54, an STC counter 55, a frame synchronization counter 56, a multiplexing unit 57, a transmission processing unit 58, a communication unit 59, and a control unit 60.

The control unit 60 is formed of, for example, the CPU of a microcomputer, and controls the entire distribution device. In particular, the control unit 60 controls the data reading unit 52, decoder 54, STC counter 55, frame synchronization counter 56, multiplexing unit 57, and communication unit 59. The signal lines for control signals supplied from the control unit 60 to each of these are omitted from the drawing.

The data reading unit 52 reads a content from the storage medium 51. The reading of data (e.g., the timing of the reading) is controlled by the control unit 60. The data reading unit 52 reads data, taking a certain cluster as a unit, on the basis of instructions from the control unit 60.

When the storage medium 51 is an HDD, a DVD, a CD-ROM, a Blu-ray disc, or the like, the storage medium 51 and the data reading unit 52 are interconnected by, for example, a SATA (Serial Advanced Technology Attachment) interface, and reading is performed by memory transfer by a DMA facility included in the CPU constituting the control unit 60.

When the storage medium 51 is a USB memory, the storage medium 51 and the data reading unit 52 are interconnected by a USB interface, and when the storage medium 51 is an SD memory card, the storage medium 51 and the data reading unit 52 are interconnected by an SD interface; in these cases data are read by a DMA facility included in the CPU constituting the control unit 60 or by software.

The storage medium 51, the data reading unit 52, and the decoder 54 are interconnected by a data bus 61.

The clock generation unit 53 generates clock pulses C53 which are used as a reference for the operation of the entire reproduction system. The generated clock pulses C53 are in the form of, for example, a 27-MHz square wave.

The decoder 54 decodes the content read by the data reading unit 52. When the content is compressively encoded according to MPEG-2, the content is decoded according to MPEG-2, and the picture data for each frame before compression are reproduced. The decoder 54 performs the decoding on the basis of the clock pulses generated by the clock generation unit 53 (with the decoding timing being controlled by the clock pulses).

The STC (System Time Clock) counter 55, also referred to as a reference clock counter, counts the clock pulses C53 output by the clock generation unit 53, and outputs a count value C55. The count value C55 is reset to an initial value of '0' each time reading of each content begins (including cases in which reading is switched from one content to another), and then the clocks C53 are counted. The count value C55 therefore indicates elapsed time or reproduction time from the start of the content, and is transmitted to the reproduction devices 11 to 14 as reference time information SCR (System Clock Reference) for the entire reproduction system.

The STC counter 55 is, for example, a 42-bit counter, and if 27-MHz clock pulses C53 are counted, the count repeats in cycles of approximately 162 seconds.

The frame synchronization counter 56 counts the number of video frames reproduced by the decoding of the content by the decoder 54, and outputs a count value C56. The count value C56 is reset to an initial value of '0' when reading of each content begins (including cases in which reading is switched from one content to another), and is incremented on input of frame timing signals included in the video signal reproduced by the decoder 54. The count value C56 therefore represents a frame number in the content (e.g., data indicating how many frames the current frame is from the start of the content), and is transmitted to the reproduction devices 11 to 14 as frame number data FCR (Frame Clock Reference).

The frame synchronization counter 56 is, for example, a 32-bit counter. For a content based on NTSC standards, 30-Hz frame timing signals are counted, so that a single cycle lasts approximately 4.5 years. Because 4.5 years is an unrealistically long time for the reproduction of a single content, the FCR could be said to represent each frame in the content uniquely.

The multiplexing unit 57 multiplexes the SCR from the STC counter 55 and the FCR from the frame synchronization counter 56 to generate synchronization packets. In the multiplexing of the SCR and FCR, the FCR value captured when the FCR value is updated (incremented) is multiplexed with the SCR value at the time of the update.

The STC counter 55 counts at a higher speed than the frame synchronization counter 56. Transmission of every SCR value counted by the STC counter 55 to the reproduction devices would require an impractically large amount of data transmission. Accordingly, the FCR value and the SCR value are read by the multiplexing unit 57 at the timings at which the frame synchronization counter 56 increments the count value C56 to generate synchronization packets in which the FCR and SCR values are multiplexed.

The transmission processing unit 58 converts the data of the content read by the data reading unit 52 to packets in a format suitable for transmission, for example, TS packets (transport stream packets).

The communication unit 59 transmits digital data. If the digital bus 20 is, for example, the communication unit 59 transmits synchronization packets as TCP packets, and transmits TS packets of audio and video data (audio and video packets) as UDP packets.

TCP packets are suitable for transmission of synchronization packets because they reliably reach their destinations without data errors. In contrast, TS packets of audio and video are transmitted as UDP packets because they enable large amounts of data to be transmitted and received in real time. Because the data field of a synchronization packet contains at most about 14 bytes, and the transmission interval is 1/30 of a second, even with TCP packets there is no problem of delay. Because it is the decoder 104 in the receiving side that operates on the basis of the FCR and SCR included in synchronization packets, transmission of the TS packets of audio and video does not have to be precisely synchronized with transmission of the synchronization packets.

Figures 4A, 4B:
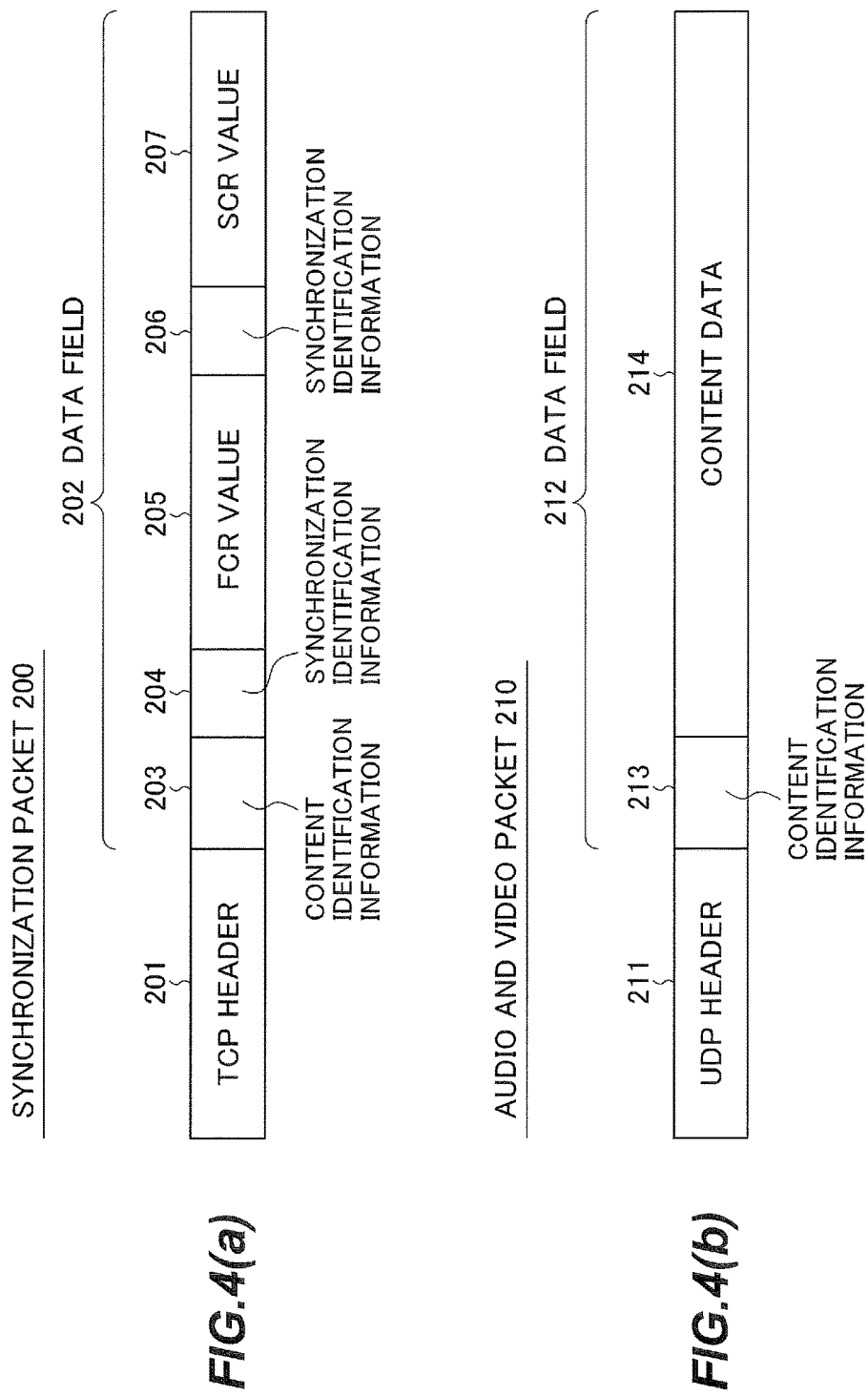
FIGS. 4(a) and 4(b) show packet structures for transmitting digital data from the digital data distribution device in FIG. 2 to the digital data reproduction device in FIG. 3 by Ethernet (registered trademark).

FIG. 4(a) shows a synchronization packet 200 that is transmitted as a TCP packet.

Included in the data field 202 that follows the TCP header 201 of the synchronization packet 200, is content identification information 203 of 16 bits, for example, which is followed successively by frame synchronization identification information 204, a 32-bit FCR value 205, frame synchronization identification information 206, and a 42-bit SCR value.

The synchronization identification information 204 that identifies the FCR value 205 is, for example, 0x01 (0x indicates that the following numeric value is a hexadecimal number), and the synchronization identification information 206 that identifies the SCR value 207 is, for example, 0x02.

FIG. 4(b) shows a, UDP packet (audio and video packet) 210 that transmits audio and video. In the data field 212 that follows the UDP header 211 of the audio and video packet, content identification information 213, of 16 bits, for example, is followed by content data 214. Audio data and video data are stored in the content data 214, divided into 188-byte TS packets.

The purpose of the content identification information 203 in the synchronization packet 200 in FIG. 4(a) and the content identification information 213 in the audio-video packet 210 in FIG. 4(b) is to confirm that the synchronization packet 200 and the audio-video packet 210 including them mutually correspond.

Figure 5:
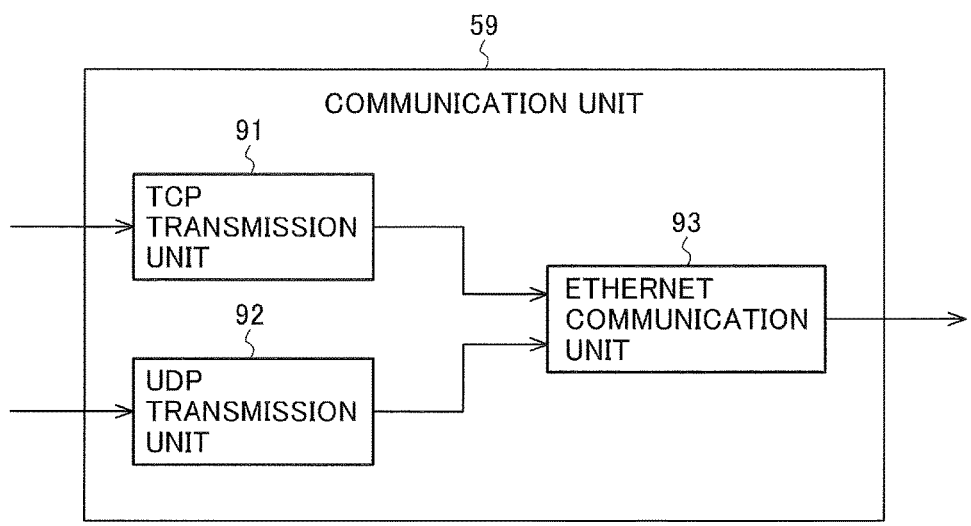
FIG. 5 is a block diagram showing an example of the configuration of the communication unit in the digital data distribution device in FIG. 2.

FIG. 5 shows an example of the configuration of the communication unit 59 in FIG. 2. The synchronization packets 200 are transmitted through an Ethernet communication unit 93 by a TCP procedure executed by a TCP transmission unit 91, and the audio-video packets 210 are transmitted through the Ethernet communication unit 93 by a UDP procedure executed by a UDP transmission unit 92.

Figure 3:
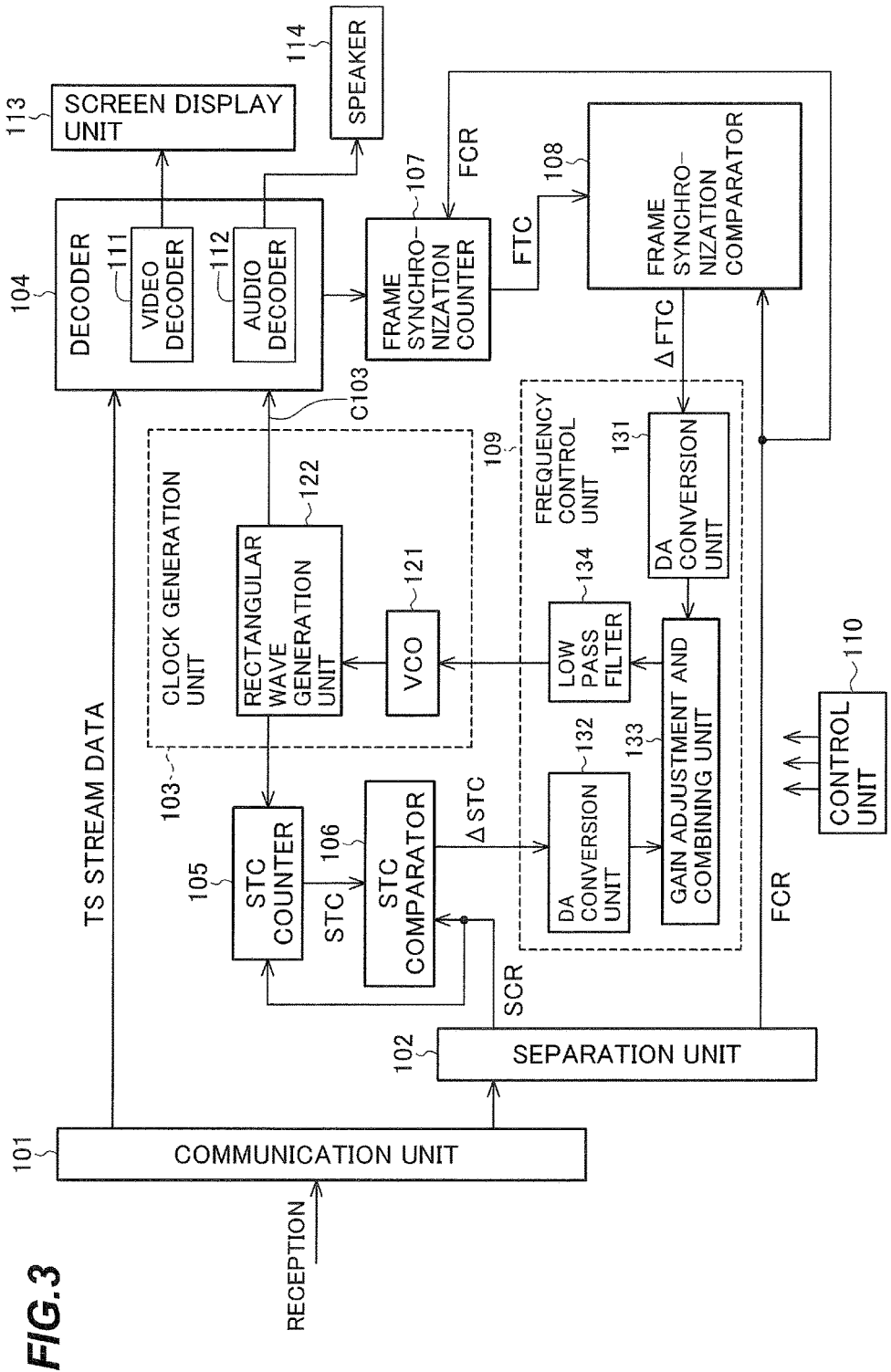
FIG. 3 is a block diagram showing an example of the configuration of the digital data reproduction device in the content reproduction system in FIG. 1.

FIG. 3 shows an example of the configuration of one of the reproduction devices 11 to 14 in FIG. 1, for example, reproduction device 11. The other reproduction devices 12 to 14 are configured identically.

The illustrated reproduction device has a communication unit 101, a separation unit 102, a clock generation unit 103, the decoder 104, an STC counter 105, an STC comparator 106, a frame synchronization counter 107, a frame synchronization comparator 108, a frequency control unit 109, and a control unit 110.

The clock generation unit 103 generates clock pulses C103 with a given frequency, 27 MHz for example, to determine the timing of reproduction operations in the reproduction device 11, in particular, the timing of decoding operations in the decoder 104.

The illustrated clock generation unit 103 has a VCO 121 and a rectangular wave generation unit 122.

The VCO (Voltage Controlled Oscillator) 121 can adjust its oscillation frequency in either the positive direction (higher frequency) or negative direction (lower frequency) according to an input voltage. The rectangular wave generation unit 122 generates square wave pulses with the oscillation frequency of the VCO.

The control unit 110 is formed of, for example, the CPU of a microcomputer, and controls the entire reproduction device. In particular, the control unit 110 controls the communication unit 101, separation unit 102, decoder 104, STC comparator 106, and frame synchronization comparator 108. The signal lines for control signals supplied from the control unit 110 to each of these are omitted from the drawing.

The communication unit 101 receives digital data, more specifically, UDP packets including content data, and TCP packets including the SCR and FCR, transmitted from the distribution device 10 through the digital bus 20, by, for example, the Ethernet protocol. TCP packets are received every 1/30 of a second.

The communication unit 101 extracts TS packets including audio and video data from the UDP packets, generates TS stream data, and supplies the generated TS stream data to the decoder 104.

The communication unit 101 also supplies the TCP packets to the separation unit 102.

The decoder 104 receives the TS stream data from the communication unit 101 and performs decoding on the basis of the clock pulses C103 output from the clock generation unit 103 (with the timing being controlled by the clock pulses). When the content transmitted from the distribution device 10 is compressively encoded according to MPEG-2, the decoder 104 decodes the content according to MPEG-2.

The decoder 104 has a video decoder 111 and an audio decoder 112. The video decoder 111 decodes TS stream data and reproduces a video picture, and the audio decoder 112 decodes TS stream data and reproduces sound. The output from the video decoder 111 is supplied to a screen display unit 113, and the output from the audio decoder 112 is supplied to a speaker 114.

The decoder 104 also supplies the frame synchronization counter 107 with frame timing signals included in the video signal reproduced by decoding.

The separation unit 102 separates the SCR data and FCR data from the synchronization packets 200, which it receives as TCP packets from the communication unit 101.

The separated SCR is supplied to the STC counter 105 and the STC comparator 106. The separated FCR is supplied to the frame synchronization counter 107 and the frame synchronization comparator 108.

The STC counter 105, also referred to as a reference clock counter, counts the clock pulses generated by the clock generation unit 103 of the reproduction device 11, and outputs a count value C105. Each time reproduction of each content transmitted from the distribution device 10 begins in the reproduction device 11, the SCR separated by the separation unit 102 from the received synchronization packet 200 is set in the STC counter 105 as an initial value, and the STC counter 105 then counts the clock pulses C103 output from the above clock generation unit 103. The count value C105 of the STC counter 105 therefore indicates elapsed time or reproduction time from the start of the content reproduced by the reproduction device 11, and is supplied to the STC comparator 106 as elapsed time information STC (System Time Clock) generated in the reproduction device 11.

The SCR data also indicate elapsed time from the start of the content. The SCR and the STC differ from each other in that the SCR is generated in the distribution device 10 and transmitted to the reproduction device 11 from the distribution device 10 whereas the STC is generated by counting the clock pulses output from the clock generation unit 103 in the reproduction device 11. To distinguish the SCR and STC, the SCR will be referred to as reference data and the STC will be referred to as internal data (data generated in the reproduction device 11).

The STC counter 105 is, for example, a 42-bit counter like the STC counter 55 in the distribution device 10.

The frame synchronization counter 107 counts the number of video frames of the content reproduced by the reproduction device 11, and outputs a count value C107. Each time reproduction of each content transmitted from the distribution device 10 begins in the reproduction device 11, the FCR separated by the separation unit 102 from the received synchronization packet 200 is set in the frame synchronization counter 107, as an initial value, and the frame synchronization counter 107 then increments the count value C107 each time one frame is reproduced by the decoder 104. More specifically, the count value C107 is incremented on input of frame timing signals included in the video signal reproduced by the decoder 54. The count value C107 of the frame synchronization counter 107 therefore represents a frame number in the content reproduced by the reproduction device 11 (e.g., data indicating how many frames the current frame is from the start of the content), and is supplied to the frame synchronization comparator 108 as frame number data FTC (Frame Time Clock).

The FCR data also indicate frame numbers. The FCR and the FTC differ from each other in that the FCR is generated in the distribution device 10 and transmitted to the reproduction device 11 from the distribution device 10 whereas the FTC is generated by counting the number of frames reproduced by the decoder 104 in the reproduction device 11. To distinguish the FCR and FTC, the FCR will be referred to as reference data and the FTC will be referred to as internal data (data generated in the reproduction device 11).

The frame synchronization counter 107 is, for example, a 32-bit counter like the frame synchronization counter 56 in the distribution device 10.

The frame synchronization comparator 108 calculates the difference $\Delta FTC$ between the FTC obtained from the frame synchronization counter 107 and the FCR separated by the separation unit 102 from the synchronization packet 200. The difference $\Delta FTC$ is expressed by the following equation (1).

$$\Delta FTC = FCR - FTC \tag{1}$$

The calculation according to equation (1) is made, when, for example, the FTC value is updated (incremented), by using the FTC value at that time and the FCR value output from the separation unit 102 at that time. Alternatively, the calculation may be performed, when new FCR data are separated by the separation unit 102, by using the FCR value at that time and the FTC value output from the frame synchronization counter 107 at that time.

Since the frame synchronization counters 56, and 107 are, for example, 32-bit counters and their count values do not reach their maximum value while the content is being reproduced, the wrapping around of one of the count values from the maximum value to zero need not be considered.

When the difference $A\Delta FTC$ obtained by equation (1) is negative, the output frequency of the clock generation unit 103 is adjusted downward. When the difference $\Delta FTC$ is positive, the output frequency of the clock generation unit 103 is adjusted upward.

The reproduction device 11 is thereby frame-synchronized to the distribution device 10, and, as a result, frame synchronization can be obtained by a plurality of reproduction devices.

The STC comparator 106 calculates the difference $\Delta STC$ between the STC from the STC counter 105 and the SCR separated by the separation unit 102 from the synchronization packet 200. The calculation is performed, when, for example, new SCR data are separated by the separation unit 102, by using the SCR value at that time and the STC value output from the STC counter 105 at that time.

The difference $\Delta STC$ is normally obtained by the following equation.

$$\Delta STC = SCR - STC \quad (2)$$

Because a single cycle lasts approximately 162 seconds in the STC counters 55, 105, calculations in the neighborhood of the timing at which the STC and SCR values wrap around from the maximum value MAX ($=2^{42}-1=4,398,046,511,103$) to zero have to be adjusted in consideration of the wrap-around. This point will be described below with reference to FIGS. 6 and 7.

Figure 6:
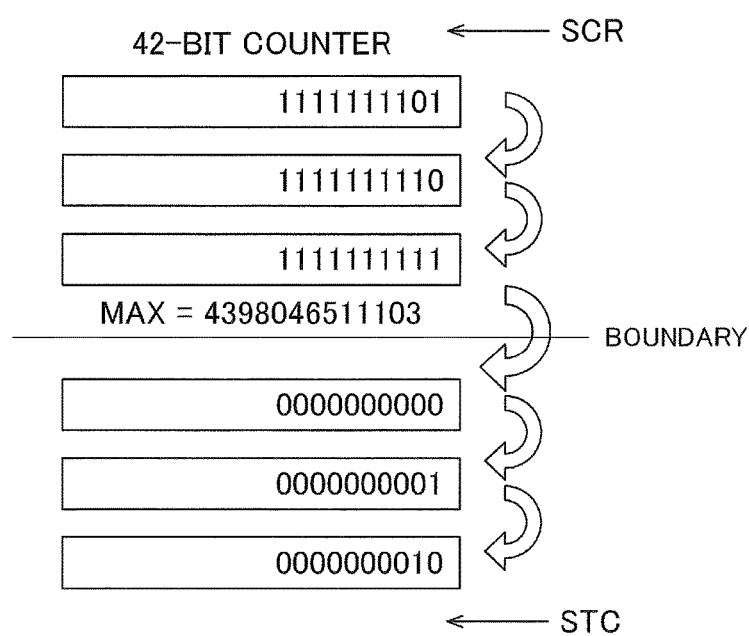
FIG. 6 is a diagram illustrating the operation of the STC comparator in the first embodiment.
Figure 7:
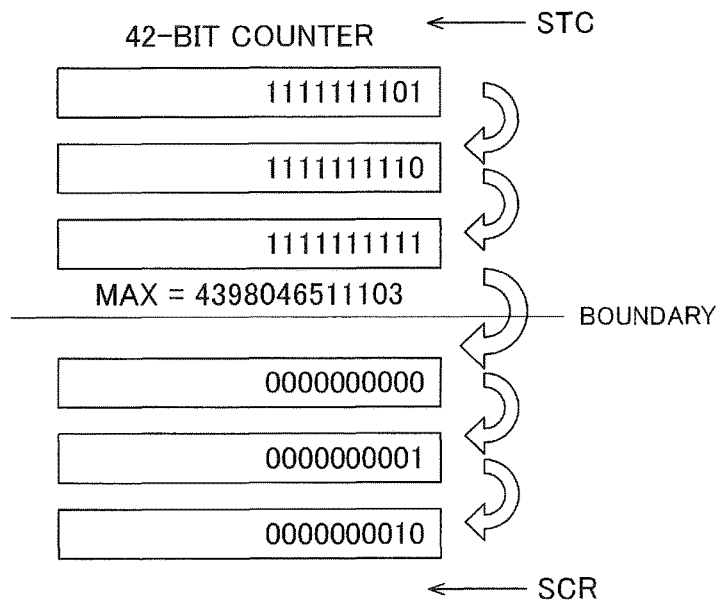
FIG. 7 is a diagram illustrating the operation of the STC comparator in the first embodiment.

FIGS. 6 and 7 show cases in which the STC value and the SCR value are located on opposite sides of the boundary at which the count values wrap around from the maximum value MAX to zero.

When frames are synchronized, the difference between SCR and STC should be less than the count value ($27 \times 10^6 \div 30 = 9 \times 10^5 = Cf$) corresponding to the 1/30-second duration of a single frame period. Therefore, $\Delta STC$ is first calculated by equation (2), and if the absolute value of the calculated $\Delta STC$ is equal to or less than Cf, the $\Delta STC$ value obtained from equation (2) is output as the correct value. If the absolute value of the calculated $\Delta STC$ is greater than Cf, the STC comparator 106 concludes that the STC and SCR values are located on opposite sides of the wraparound boundary from the maximum value MAX to zero, and carries out the following process.

First, if $\Delta STC$ is greater than Cf, the STC comparator 106 concludes that the SCR value occurs just before the timing of the change from the maximum value MAX to zero as in FIG. 6, and is therefore close to the maximum value MAX, and that the STC value occurs just after the timing of the change from the maximum value MAX to zero, and is therefore close to zero, and recalculates the difference $\Delta STC$ by the following equation (3).

$$\Delta STC = (SCR - MAX) - STC \quad (3)$$

If the $\Delta STC$ value calculated from equation (2) is less than $-Cf$, the STC comparator 106 concludes that the SCR value occurs just after the timing of the change from the maximum value MAX to zero as in FIG. 7, and is therefore close to zero, and that the STC value occurs just before the timing of the change from the maximum value MAX to zero, and is therefore close to the maximum value MAX, and recalculates the difference $\Delta STC$ by the following equation (4).

$$\Delta STC = SCR - (STC - MAX) \quad (4)$$

When the difference $\Delta STC$ obtained by equation (2), (3), or (4) is negative (this includes the case in FIG. 6), STC is found to lead SCR, and the output frequency of the clock generation unit 103 is adjusted downward.

When the difference $\Delta STC$ obtained by equation (2), (3), or (4) is positive, (this includes the case in FIG. 7), STC is found to lag SCR, and the output frequency of the clock generation unit 103 is adjusted upward.

The frequency control unit 109 has DA conversion units 131, 132, a gain adjustment and combining unit 133, and a low pass filter 134.

DA conversion unit 131 converts the digital signal representing the difference $\Delta FTC$ output from the frame synchronization comparator 108 to an analog signal.

DA conversion unit 132 converts the digital signal representing the difference $\Delta STC$ output from the STC comparator 106 to an analog signal.

The gain adjustment and combining unit 133 uses internal amplifiers or the like to adjust the gain of the output from DA conversion unit 131 (the analog signal converted from the difference $\Delta FTC$ output from the frame synchronization comparator 108) and the gain of the output from DA conversion unit 132 (the analog signal converted from the difference $\Delta STC$ output from the STC comparator 106), combines the adjusted outputs, and generates an analog control signal (voltage waveform). The combining operation is performed by, for example, analog summing. The analog control signal generated by the gain adjustment and combining unit 133 is input to the low pass filter 134.

The low pass filter 134 receives the output from the gain adjustment and combining unit 133, removes its high-frequency component, and supplies the resultant signal to the VCO 121. The high-frequency component of the output from the gain adjustment and combining unit 133 is removed in order to prevent the high-frequency component from causing rapid changes in the VCO 121 thereby to stabilize frequency control.

By the processing described above, the frequency control unit 109 controls the output frequency of the clock generation unit 103 on the basis of the differences $\Delta FTC$ and $\Delta STC$. As a result, the timing of decoding by the decoder 104 is controlled, and the display of a video picture by the screen display unit 113 and output of sound by the speaker 114 can be synchronized with the operation of the decoder 54 in the distribution device 10.

The frame synchronization operation will be described with reference to FIGS. 8 and 9.

Figure 8:
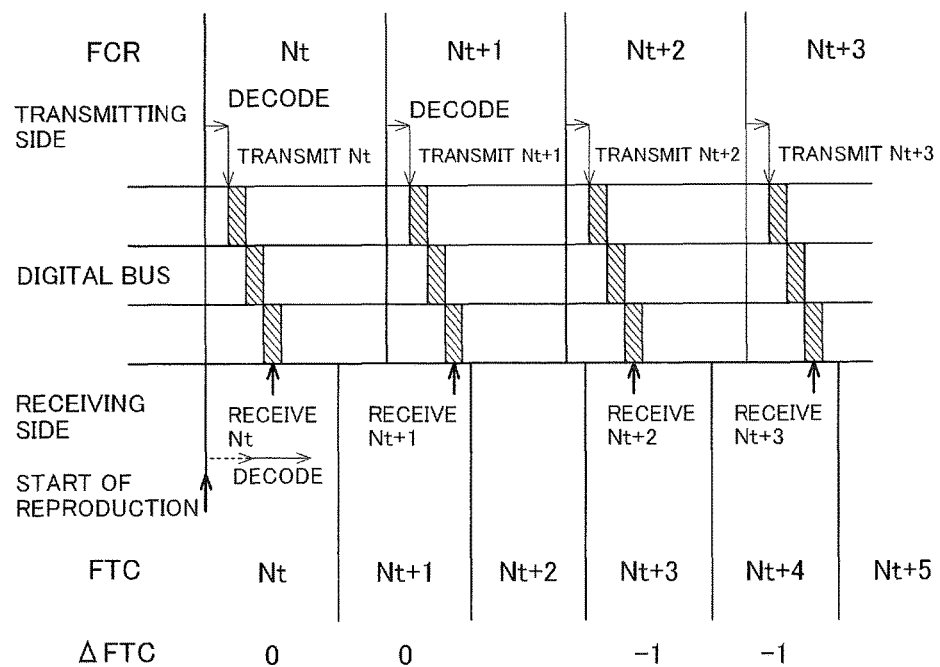
FIG. 8 is a diagram illustrating the frame synchronization operation in the first embodiment.

FIG. 8 shows a case in which reproduction by the decoder 104 in reproduction device 11 is too fast. When the distribution device 10 transmits FCR values of Nt+2 and Nt+3, reproduction device 11 generates FTC values of Nt+3 and Nt+4, and the difference $\Delta FTC$ obtained by equation (1) is $-1$. In this case, as described above, reproduction by the decoder 104 is slowed by lowering the output frequency of the clock generation unit 103, thereby restoring the frame offset to zero.

Figure 9:
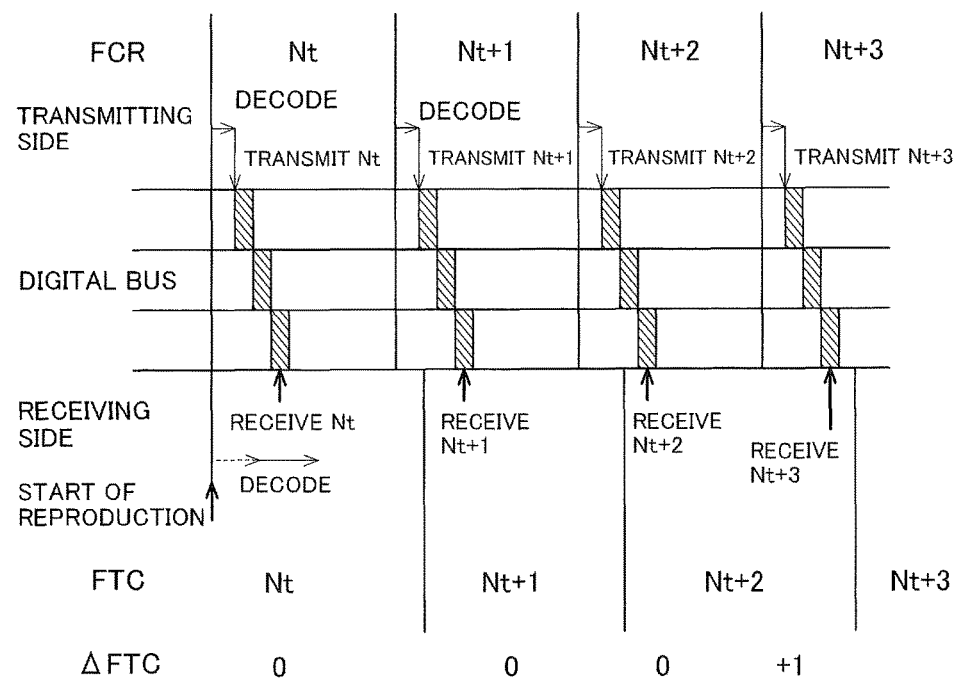
FIG. 9 is a diagram illustrating the frame synchronization operation in the first embodiment.

FIG. 9 shows a case in which reproduction by the decoder 104 in reproduction device 11 is too slow. During the interval while reproduction device 11 generates an FTC value of Nt+2, at first an FCR value of Nt+2 is received from the distribution device 10, in which case the frame number offset is zero, but next an FCR value of Nt+3 is received, and the difference $\Delta FTC$ obtained by equation (1) is +1. In this case, as described above, reproduction by the decoder 104 is sped up by raising the output frequency of the clock generation unit 103, thereby restoring the frame offset to zero.

As described above, by control of the output frequency of the clock generation unit 103 according to the output from the frame synchronization comparator 108, the displayed video offset can be held to within ±1 frame interval. The displayed video picture can also be more precisely synchronized by control of the output frequency of the clock generation unit 103 based on the output from the STC comparator 106.

As a result of performing the above-described control in each reproduction device, reproduction by a plurality of reproduction devices can be synchronized. Synchronization is not lost even during lengthy reproduction.

Even when, in a state in which a first reproduction device is already reproducing a content, a second reproduction device is connected to the distribution device, synchronization between these reproduction devices can be secured. Even when a plurality of other reproduction devices are connected at different timings after the first, all the reproduction devices can be similarly synchronized.

In addition, when synchronization is lost, it can be recovered without skipping frames.

Second Embodiment

Figure 10:
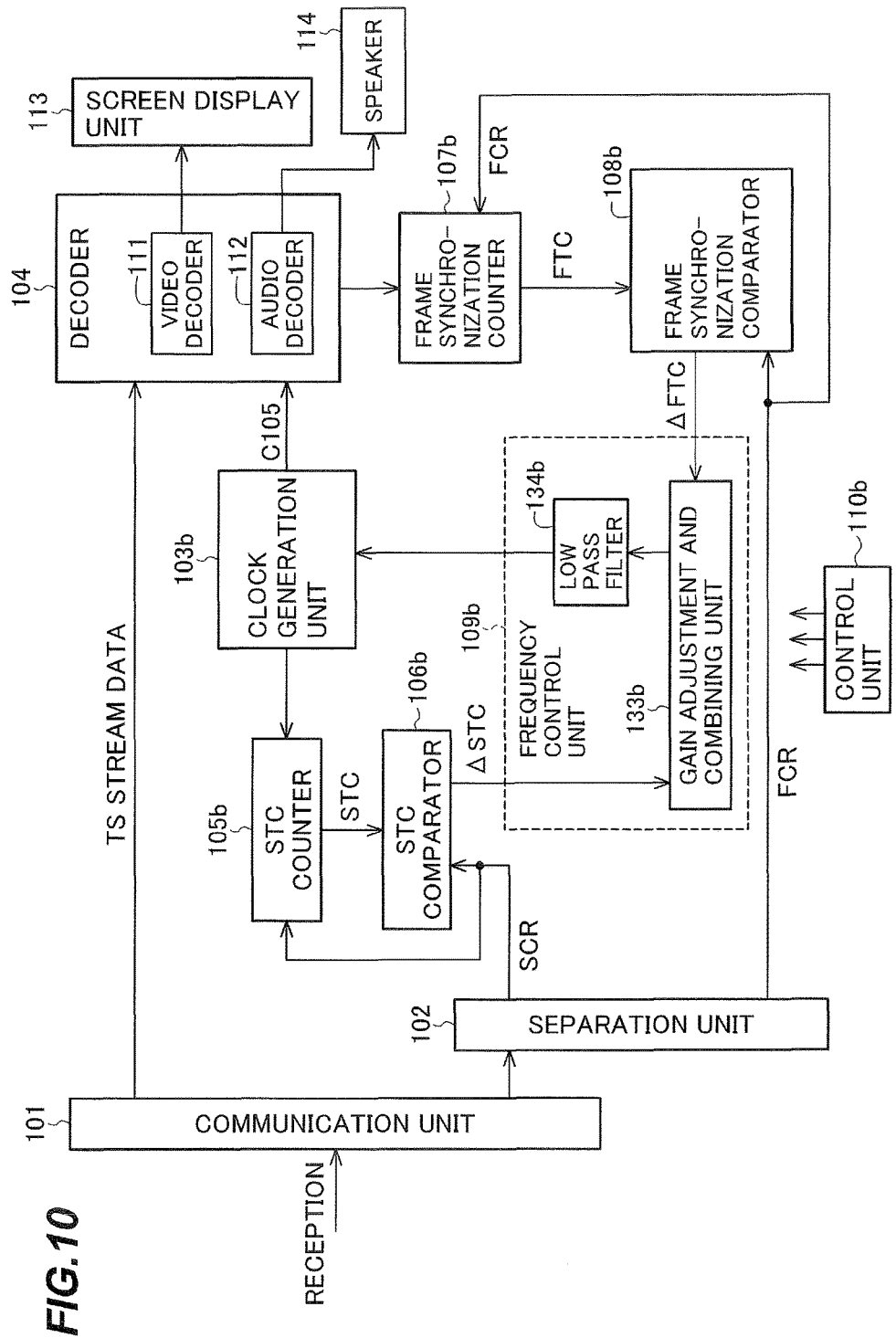
FIG. 10 is a block diagram showing an example of the configuration of the digital data reproduction device in a second embodiment of the invention.

FIG. 10 shows a reproduction device in the second embodiment of the invention.

The reproduction device in FIG. 10 is generally the same as the reproduction device in FIG. 3, but with the following differences.

First, the reproduction device in FIG. 10 lacks the DA conversion units 131, 132 in FIG. 3.

The clock generation unit 103, STC comparator 106, frame synchronization counter 107, frame synchronization comparator 108, gain adjustment and combining unit 133, and low pass filter 134 in FIG. 3 are replaced by a clock generation unit 103b, an STC comparator 106b, a frame synchronization counter 107b, a frame synchronization comparator 108b, a gain adjustment and combining unit 133b, and a low pass filter 134b that are configured in software, that is, in a programmed computer system.

The gain adjustment and combining unit 133b and low pass filter 134b in the second embodiment constitute a frequency control unit 109b.

Each of these elements in the second embodiment performs the same process as the corresponding element in the first embodiment (indicated by the same reference characters without the additional letter 'b').

The output from the gain adjustment and combining unit 133b, however, is digital data indicating a result of combination. The low pass filter 134b performs low pass filtering (filtering in the time axis direction) on a time series of the digital data.

The clock generation unit 103b is formed of a digitally controlled oscillator. The digitally controlled oscillator is configured in hardware, and can change its output frequency according to the output data (digital data) of the low pass filter 134b.

The control unit 110b, like the control unit 110 in FIG. 3, is formed of the CPU of a microcomputer. The functions of the elements configured in software as described above can all be implemented by the CPU of the control unit 110b, but they are indicated as separate elements for convenience.

The operation of the STC comparator 106b and gain adjustment and combining unit 133b is similar to the operation of the STC comparator 106 and gain adjustment and combining unit 133, respectively, but the operation of the STC comparator 106b and gain adjustment and combining unit 133b will be described below with reference to flowcharts.

Figure 11:
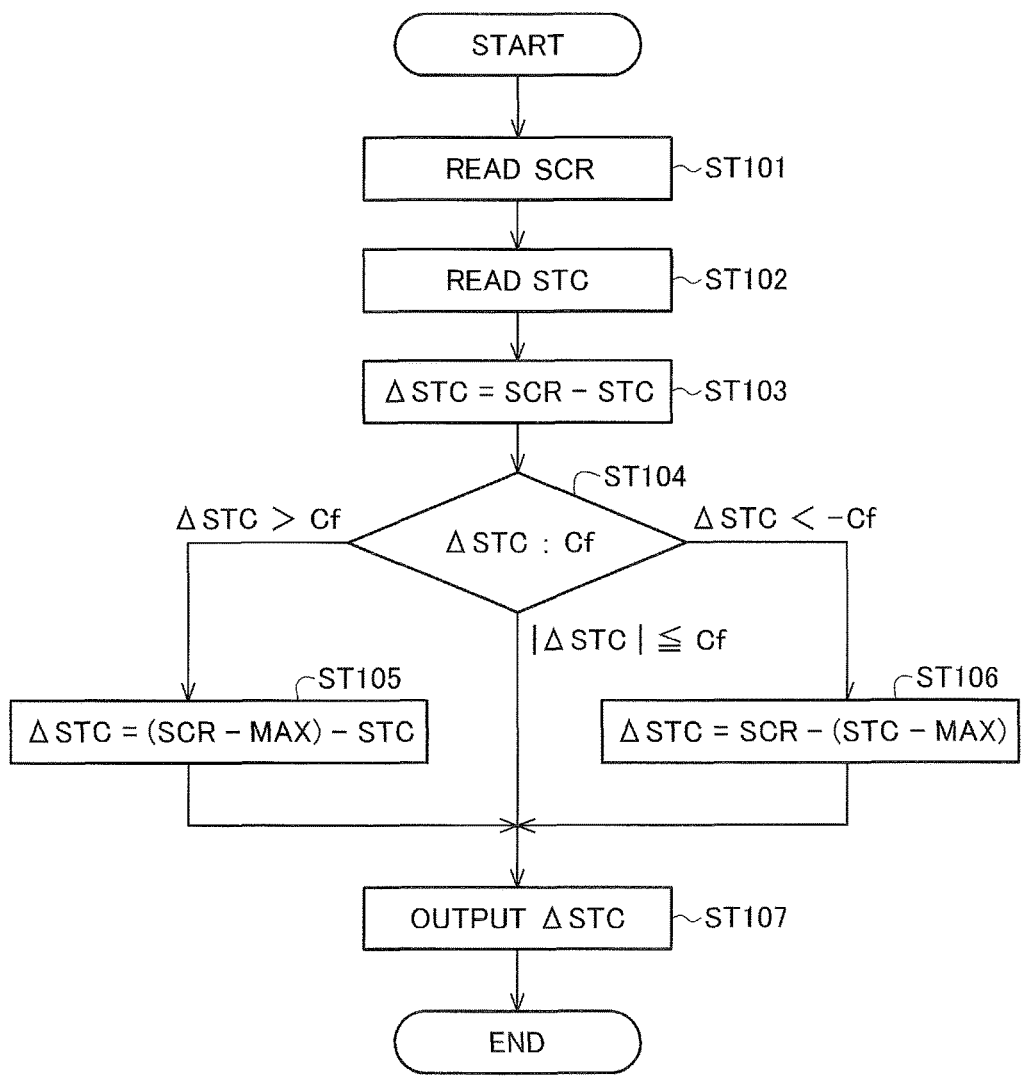
FIG. 11 is a flowchart illustrating the operation of the STC comparator in the digital data reproduction device in the second embodiment.

First, the operation of the STC comparator 106b will be described with reference to FIG. 11.

First, the STC comparator 106b reads the SCR output from the separation unit 102 (step ST101).

Next, it reads the STC from the STC counter 104b (step ST102).

Next, STC is subtracted from SCR to obtain the difference $\Delta STC$ (step ST103).

Next, $\Delta STC$ is compared with Cf ($=9 \times 10^5$) (step ST104).

If the result of the comparison in step ST104 is that $\Delta STC$ is greater than Cf, the STC comparator 106b proceeds to step ST105, recalculates the difference $\Delta STC$ by equation (3) above, that is, by the equation below, and proceeds to step ST107.

$$\Delta STC = (SCR - MAX) - STC$$

If the result of the comparison in step ST104 is that $\Delta STC$ is less than $-Cf$, the STC comparator 106b proceeds to step ST105, recalculates the difference $\Delta STC$ by equation (4) above, that is, by the equation below, and proceeds to step ST107.

$$\Delta STC = SCR - (STC - MAX)$$

If $\Delta STC$ is equal to or greater than $-Cf$ and equal to or less than Cf in step ST104, that is, if $|\Delta STC| \leq Cf$, the STC comparator 106b proceeds immediately to step ST107.

In step ST107, the STC comparator 106b outputs the difference $\Delta STC$.

The difference $\Delta STC$ is supplied to the gain adjustment and combining unit 133b as in the first embodiment.

In the first embodiment, the difference $\Delta STC$ undergoes DA conversion by the DA conversion unit 132 and is then supplied to the gain adjustment and combining unit 133. In the second embodiment, the difference $\Delta STC$ is supplied directly to the gain adjustment and combining unit 133b without undergoing DA conversion.

Figure 12:
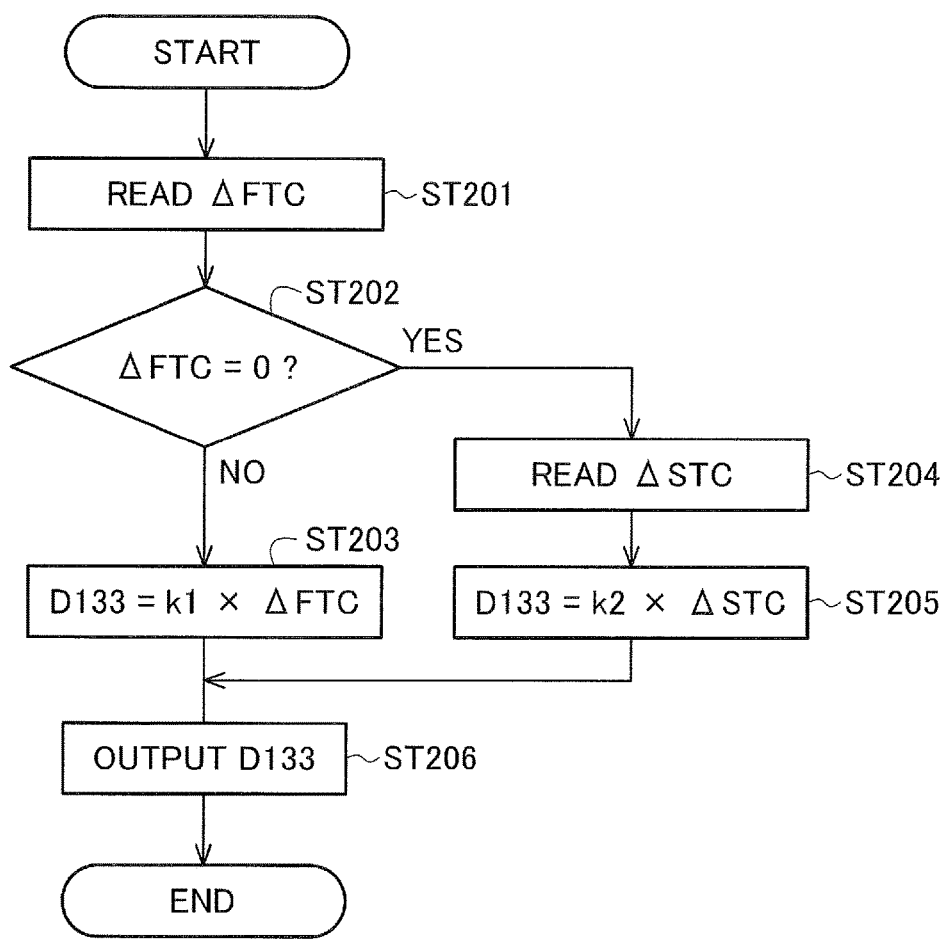
FIG. 12 is a flowchart illustrating the operation of the gain adjustment and combining unit in the digital data reproduction device in the second embodiment.

Next, the operation of the gain adjustment and combining unit 133b will be described with reference to FIG. 12.

First, the gain adjustment and combining unit 133b reads $\Delta FTC$ from the frame synchronization comparator 108b (ST201).

Next, it determines whether or not $\Delta FTC$ is zero (ST202).

If $\Delta FTC$ is not zero, the gain adjustment and combining unit 133b proceeds to step ST203 and obtains the combination result D133 by multiplying $\Delta FTC$ by a given coefficient k1.

If $\Delta FTC$ is zero, in step ST202, the gain adjustment and combining unit 133b proceeds to step ST204 and reads $\Delta STC$ from the STC comparator 106b. Then in step ST205, the combination result D133 is obtained by multiplying $\Delta STC$ by a given coefficient k2.

The combination result D133 is output after step ST203 or ST205. The combination result D133 is supplied to the clock generation unit 103b through the low pass filter 134b as a frequency control signal.

The output frequency of the clock generation unit 103b is controlled according to the frequency control signal supplied through the low pass filter 134b.

Other than the differences described above, the operation of the second embodiment is the same as the operation of the first embodiment.

Advantages of the configuration of the second embodiment are that gain adjustment can be performed easily by modifying software, and high-precision control is possible.

Third Embodiment

Figure 13:
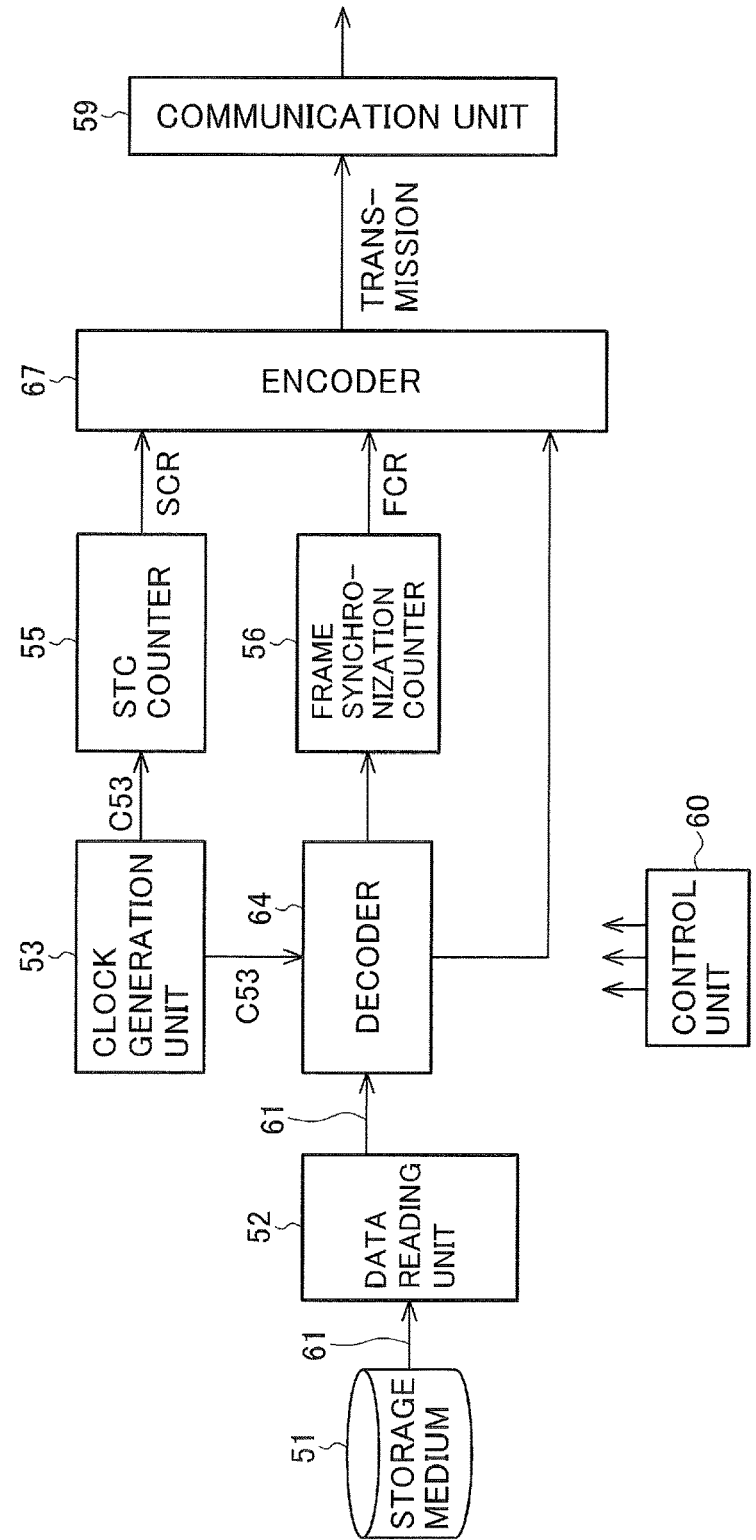
FIG. 13 is a block diagram showing an example of the configuration of the digital data distribution device in a third embodiment of the invention.
Figure 14:
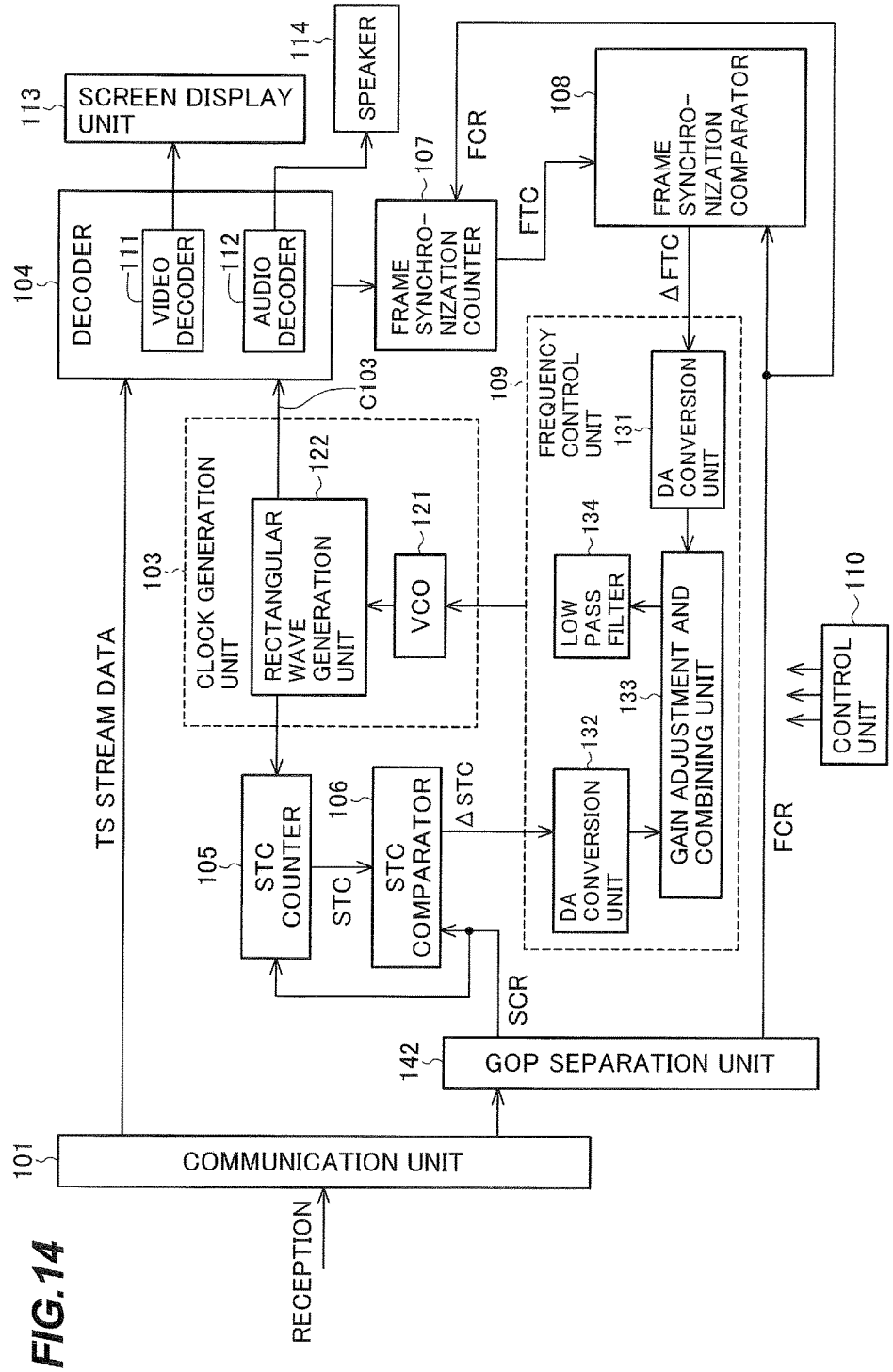
FIG. 14 is a block diagram showing an example of the configuration of the digital data reproduction device in a third embodiment.

FIGS. 13 and 14 show a digital data distribution device and a digital data reproduction device in the third embodiment of the invention. These can be used respectively as the distribution device 10 and the reproduction devices 11 to 14 in the system shown in FIG. 1.

The distribution device in FIG. 13 is generally the same as the distribution device in FIG. 2, and the same or similar elements are indicated by the same reference characters.

The distribution device in FIG. 13 differs in that the decoder 54 in FIG. 2 has been replaced with a different decoder 64, and the multiplexing unit 57 and transmission processing unit 58 in FIG. 2 have been replaced with an encoder 67.

The decoder 64 in FIG. 13 is generally the same as the decoder 54 in FIG. 2, but a plurality of frames of content data are organized into a GOP (group of pictures) and the content data are compressively encoded, taking each GOP as a unit, and when the content is decoded, the count value C56 of the frame synchronization counter 56 and the count value C55 of the STC counter 55 are output as the FCR value and the SCR value, respectively, only for a representative frame in each GOP, for example, the first frame in the GOP.

The encoder 67 compressively encodes the data decoded by the decoder 64 to generate stream data (encoded data) in units of GOPs, and inserts the SCR output from the STC counter 55 and the FCR output from the frame synchronization counter 56 into the GOP header at the start of the GOP. The stream data in units of GOPs are then packetized, i.e., converted to UDP packets.

The reproduction device in FIG. 14 is generally the same as the reproduction device in FIG. 3, and the same or similar elements are indicated by the same reference characters.

The reproduction device in FIG. 14 differs in that the separation unit 102 in FIG. 3 has been replaced with a GOP separation unit 142.

Since the stream data in units of GOPs including the FCR and SCR are transmitted from the distribution device to the reproduction device after having been packetized, the reproduction device receives data representing audio and video together with the FCR and SCR used for synchronization.

The GOP separation unit 142 separates the FCR and SCR embedded by the distribution device from the GOP header in the transmitted packet data.

For each GOP, the frame synchronization comparator 108 compares the FCR with the FTC and the STC comparator 106 compares the SCR with the STC. Since each GOP consists of, for example, 15 frames, these comparisons are performed, for example, once every 15 frames.

Other than the differences described above, the configuration and operation of the third embodiment are the same as the configuration and operation of the first embodiment. As will be understood from the third embodiment, the invention is not limited to configurations in which data indicating a frame number and elapsed time are transmitted from a distribution device to a reproduction device for each of the frames constituting a video content, and the reproduction device also generates data indicating a frame number and elapsed time for each of the frames constituting the video content, compares the generated data with the corresponding data transmitted from the transmitting device, and controls the output frequency of its clock generation unit on the basis of the comparison result; configurations in which the distribution device transmits data indicating a frame number and elapsed time to the reproduction device for at least some frames constituting the video content (for example, once every given number of frames), and the reproduction device generates data indicating a frame number and elapsed time for at least some of the frames constituting the video content (the same frames for which the distribution device generates data indicating the above frame number and elapsed time), compares the generated data with the corresponding data transmitted from the transmitting device, and controls the output frequency of the clock generation unit on the basis of the comparison result.

A distribution device according to the invention, a reproduction device according to the invention, and a reproduction system including these devices have been described above, but the invention also includes the distribution method and the reproduction method implemented by these devices and the system. In addition, the invention also includes programs for causing a computer to execute the functions and processes carried out in these devices, the system, or these methods, and a computer readable recording medium on which such a program is recorded.

REFERENCE CHARACTERS 51 storage medium, 52 data reading unit, 53 clock generation unit, 54 decoder, 55 STC counter, 56 frame synchronization counter, 57 multiplexing unit, 58 transmission processing unit, 59 communication unit, 60 CPU, 64 decoder, 67 encoder, 101 communication unit, 102 separation unit, 103 clock generation unit, 104 decoder, 105 STC counter, 106, 106b STC comparator, 107, 107b frame synchronization counter, 108, 108b frame synchronization comparator, 110, 110b control unit, 111 video decoder, 112 audio decoder, 113 screen display unit, 114 speaker, 121 VCO, 122 rectangular wave generation unit, 131, 132 DA conversion unit, 133, 133b gain adjustment and combining unit, 134, 134b low pass filter, 142 GOP separation unit.

What is claimed is:

1. A digital data reproduction device comprising:
   a clock generator generating clock pulses with a given frequency;
   a communicator receiving data of a content including audio and video and, for each of all frames constituting the video, data indicating elapsed time from the start of the content and data indicating a frame number in the content;
   a decoder operating on the clock pulses to decode the audio and the video of the content received by the communicator;
   a separator separating the data indicating the elapsed time and the data indicating the frame number from the data received by the communicator;
   a reference clock counter in which the data indicating the elapsed time received by the communicator is set as an initial value when, on a basis of the data of the content received by the communicator, reproduction of the content begins, the reference clock counter counting the clock pulses generated by the clock generator to generate internal data indicating elapsed time from the start of the content for each of all the frames constituting the video of the content;
   a frame synchronization counter in which the data indicating the frame number received by the communicator is set as an initial value, when the reproduction of the content begins, the frame synchronization counter counting the number of frames constituting the video decoded by the decoder to generate internal data indicating a frame number in the content for each of all the frames constituting the video of the content;

a frame synchronization comparator comparing the data indicating the frame number received by the communicator with the internal data generated by the frame synchronization counter, during the reproduction of the content;

a clock comparator comparing the data indicating the elapsed time received by the communicator with the internal data generated by the reference clock counter, during the reproduction of the content; and a frequency controller combining a comparison result obtained by the frame synchronization comparator with a comparison result obtained by the clock comparator and controlling the frequency of the clock pulses generated by the clock generator on a basis of a result of combination.

2. The digital data reproduction device of claim 1, wherein the frequency controller comprises:

a gain adjustment and combiner combining the comparison result obtained by the frame synchronization comparator with the comparison result obtained by the clock comparator; and a low pass filter for eliminating a high frequency component of an output of the gain adjustment and combiner.

3. A digital data reproduction device comprising:

a clock generator generating clock pulses with a given frequency;

a communicator receiving data of a content including audio and video in units of GOPs;

the communicator also receiving data indicating elapsed time from the start of the content and data indicating a frame number in the content for a first frame in each of the GOPs;

a decoder operating, on the clock pulses to decode the audio and the video of the content received by the communicator;

a separator separating the data indicating the elapsed time and the data indicating the frame number from GOP headers of the data of the content received by the communicator, a reference clock counter in which the data indicating the elapsed time received by the communicator is set as an initial value when, on a basis of the data of the content received by the communicator, reproduction of the content begins, the reference clock counter counting the clock pulses generated by the clock generator to generate internal data indicating elapsed time from the start of the content for the first frame in each of the GOPs;

a frame synchronization counter in which the data indicating the frame number received by the communicator is set as an initial value, when the reproduction of the content begins, the frame synchronization counter counting the number of frames constituting the video decoded by the decoder to generate internal data indicating a frame number in the content for the first frame in each of the GOPs;

a frame synchronization comparator comparing the data indicating the frame number received by the communicator with the internal data generated by the frame synchronization counter, during the reproduction of the content;

a clock comparator comparing, the data indicating the elapsed time received by the communicator with the internal data generated by the reference clock counter, during the reproduction of the content; and a frequency controller combining a comparison result obtained by the frame synchronization comparator with a comparison result obtained by the clock comparator and controlling the frequency of the clock pulses generated by the clock generator on a basis of a result of combination.

4. A digital data reproduction method comprising:

receiving data of a content including audio and video and, for each of all frames constituting the video, data indicating elapsed time from the start of the content and data indicating a frame number in the content;

using the clock pulses with a given frequency generated by a clock generator, and decoding the audio and the video of the content received in said receiving;

separating the data indicating the elapsed time and the data indicating the frame number from the data received in the receiving;

setting the elapsed time data received in said receiving to an initial value when, on a basis of the data of the content received in the receiving, reproduction of the content begins, and counting the clock pulses generated by the clock generator to generate internal data indicating elapsed time from the start of the content for each of all of the frames constituting the video of the content;

setting the frame number received in the receiving to an initial value, when the reproduction of the content begins, and counting the number of frames constituting the video decoded in the decoding to generate internal data indicating a frame number in the content for each of all of the frames constituting the video of the content;

comparing the data indicating the frame number received in the receiving with the internal data generated in the frame number setting, during the reproduction of the content;

comparing the data indicating the elapsed time received in the receiving with the internal data generated in the elapsed time data setting, during the reproduction of the content; and combining a result of comparison obtained in the comparing the data indicating the frame number with a result of comparison obtained in the comparing the data indicating the elapsed time received in the receiving.

5. A non-transitory computer readable recording medium for storing a program for causing a computer to execute the digital data reproduction method of claim 4.

* * * * *